United States Patent [19]
Butler et al.

[11] Patent Number: 5,082,612
[45] Date of Patent: Jan. 21, 1992

[54] METHOD OF MAKING AN OIL SEAL HAVING TWO LIPS FORMED BY SPLITTING THE BLANK

[75] Inventors: John D. Butler, Van Wert, Ohio; Jon A. Chandler, Brighton, Mich.

[73] Assignee: Federal-Mogul Corporation, Southfield, Mich.

[21] Appl. No.: 638,721

[22] Filed: Jan. 7, 1991

Related U.S. Application Data

[62] Division of Ser. No. 347,084, May 3, 1989, Pat. No. 5,013,052.

[51] Int. Cl.⁵ ............................................. B29C 43/18
[52] U.S. Cl. .................................... 264/138; 264/154; 264/156; 264/163; 264/262; 264/266; 264/268; 425/DIG. 47
[58] Field of Search ............... 264/266, 268, 163, 262, 264/138, 154, 156; 425/DIG. 47

[56] References Cited

U.S. PATENT DOCUMENTS

| | | |
|---|---|---|
| 3,443,845 | 5/1969 | Walchle et al. ............... 277/227 |
| 4,171,561 | 10/1979 | Bainard et al. ............... 277/153 |
| 4,464,322 | 8/1984 | Butler ............................. 264/262 |
| 4,613,143 | 9/1986 | Butler ............................. 277/134 |

Primary Examiner—Jan H. Silbaugh
Assistant Examiner—Brian J. Eastley
Attorney, Agent, or Firm—Lawrence J. Shurupoff

[57] ABSTRACT

A method of making an oil seal (10) having two separate annular lips (62, 64) formed by splitting a single lip liner blank (12). The lip liner blank is an annular wafer having an annular groove (14) formed on one side (15) of the wafer at the point on the wafer where the wafer is intended to be split into two annular pieces (49, 50). A mold (32) is loaded with the lip liner blank (12), a prep ring of elastomeric material (43) and a seal case (b 44) and then closed thereby clamping the prep ring and wafer between upper and lower dies (40 and 36) of the mold. In the molding step the prep ring and wafer are heated and compressed causing the prep ring to become molten as it flows over the wafer. The molten elastomeric material enters the groove and pressure exerted by the elastomeric material against the groove splits the wafer into two annular pieces (49, 50). A first annular piece (49) is displaced in the mold to the desired location of the excluder lip (64). A second annular piece of the wafer lines the main lip (62) of the oil seal (10).

7 Claims, 3 Drawing Sheets

```
┌─────────────────────────────────┐
│  CUTTING A GROOVE IN AN ANNULAR │
│  WAFER OF SEAL LIP LINING MATERIAL │
│           (FIGS 2-4)            │
└─────────────────────────────────┘
                 │
                 ▼
┌─────────────────────────────────┐
│  LOADING THE WAFER AND A RING OF │
│  ELASTOMERIC MATERIAL INTO A SEAL│
│       FORMING MOLD (FIG-5)       │
└─────────────────────────────────┘
                 │
                 ▼
┌─────────────────────────────────┐
│   MOLDING THE WAFER AND THE RING │
│    UNDER HEAT AND COMPRESSION    │
│           (FIGS 6 & 7)           │
└─────────────────────────────────┘
                 │
                 ▼
┌─────────────────────────────────┐
│ SPLITTING THE WAFER INTO TWO OR  │
│ MORE RING PIECES AND SHIFTING A  │
│ FIRST RING PIECE AWAY FROM A     │
│ SECOND RING PIECE WITHIN THE SEAL│
│         FORMING MOLD (FIG-8)     │
└─────────────────────────────────┘
                 │
                 ▼
┌─────────────────────────────────┐
│   REMOVING THE MOLDED WAFER AND  │
│   RING FROM THE SEAL FORMING MOLD│
└─────────────────────────────────┘
                 │
                 ▼
┌─────────────────────────────────┐
│   TRIMMING THE SECOND RING PIECE │
│   AND RING TO FORM A FINISHED SEAL│
│   HAVING SECOND LINED SEAL LIP   │
│           (FIG-10)               │
└─────────────────────────────────┘
```

*Fig-1*

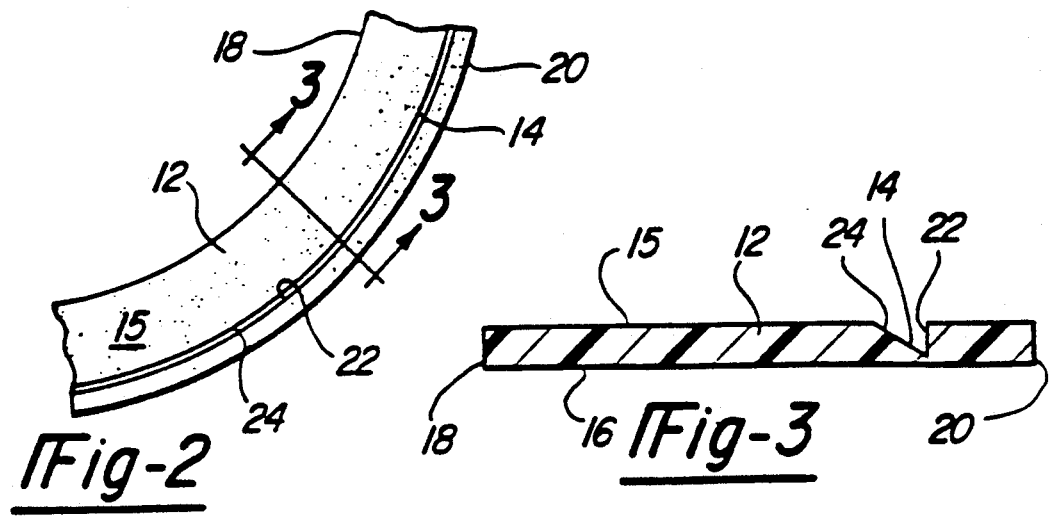
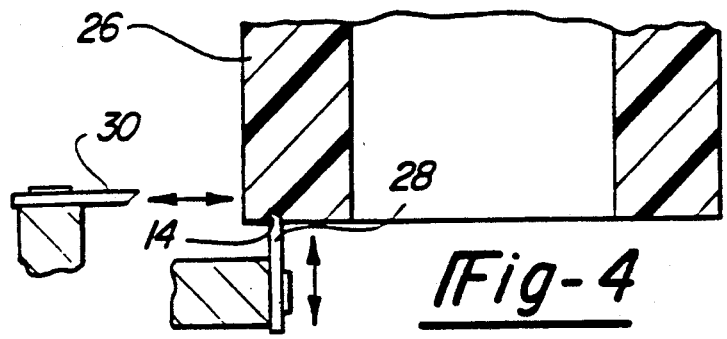
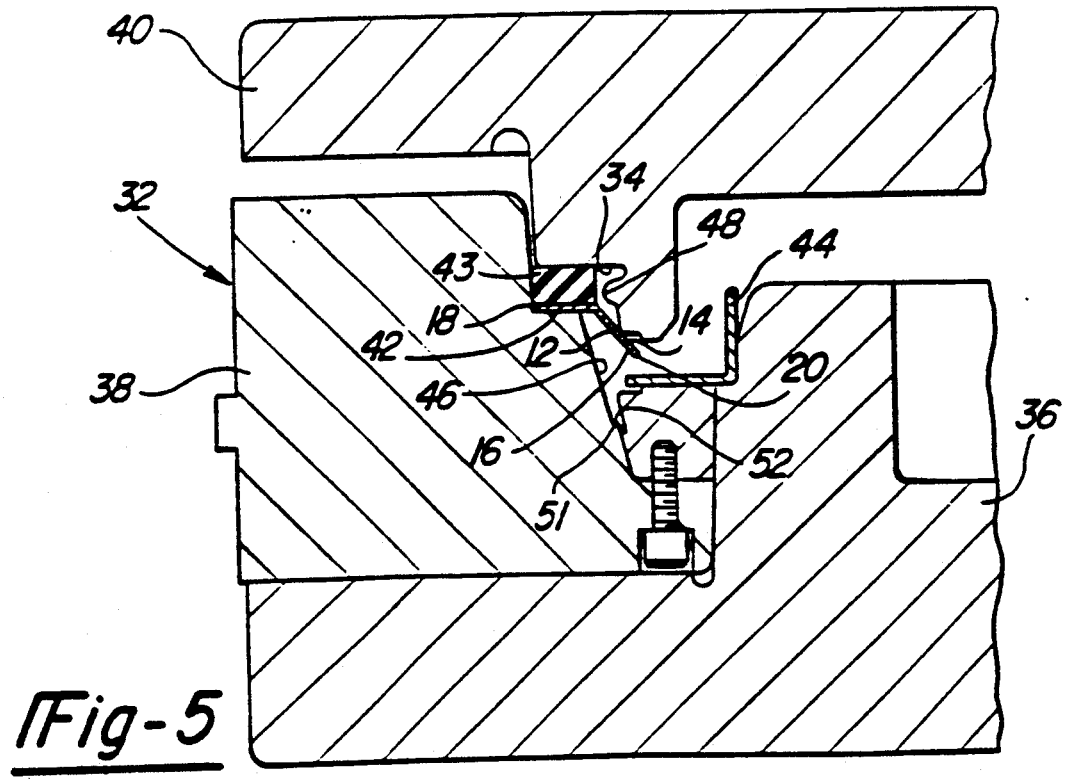

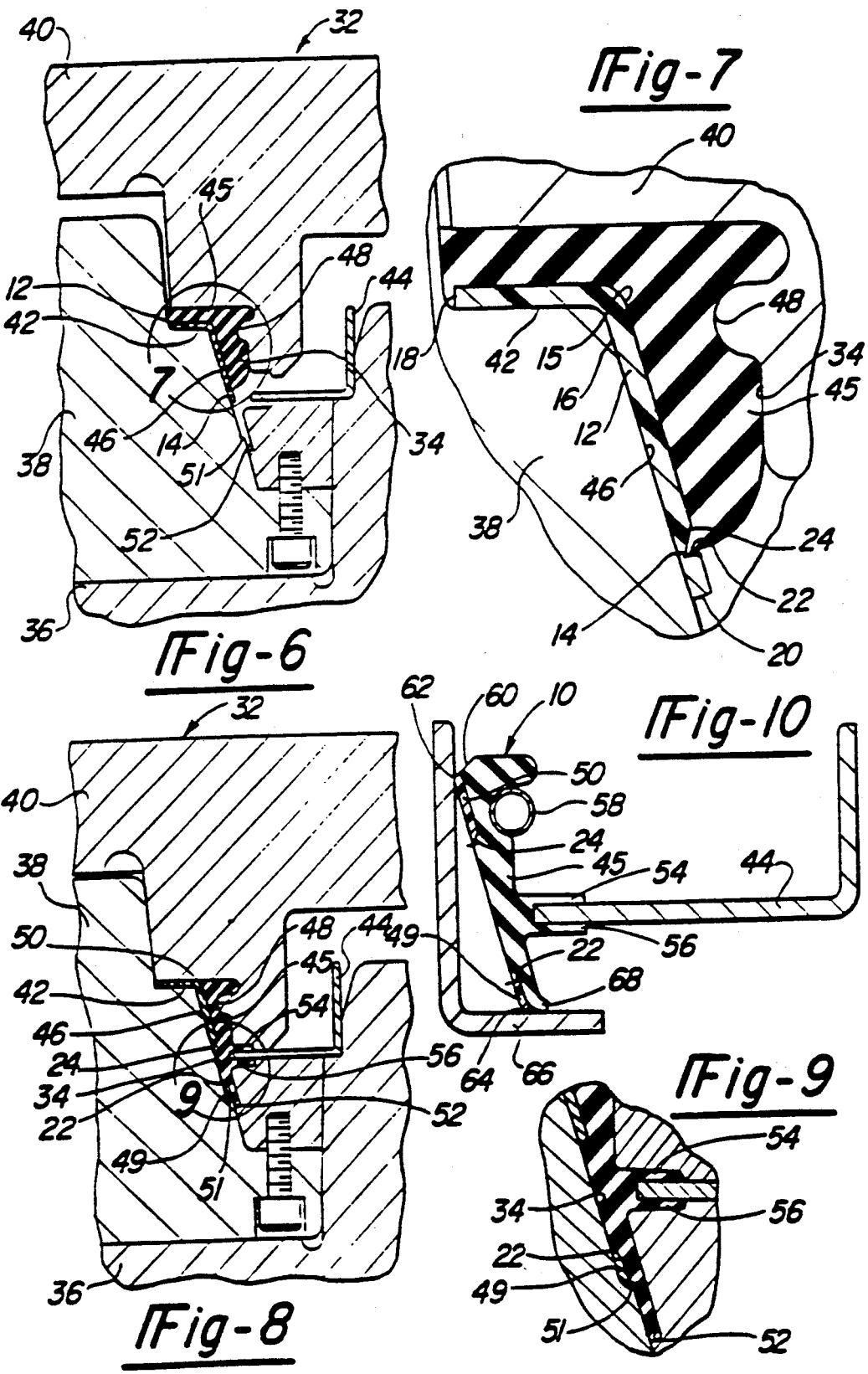

METHOD OF MAKING AN OIL SEAL HAVING TWO LIPS FORMED BY SPLITTING THE BLANK

This is a division of application Ser. No. 347,084, filed May 3, 1989, now U.S. Pat. No. 5,013,052.

TECHNICAL FIELD

The present invention relates to a method of making oil seals having a plurality of sealing lips using a special annular wafer of lip lining material. The invention also relates to the special wafer of lip lining material used in the method.

BACKGROUND ART

The advantages of providing a liner of friction reducing, wear resistant material on one lip of an oil seal are known in the art. Some of the advantages of lining the lip of an oil seal include improving durability and wear resistance. Another advantage is the reduction of friction between the relatively rotating parts. Suitable liners are made from filled or unfilled polytetrafluoroethylene (PTFE) or other materials. PTFE suitable for oil seals may include fillers such as fiberglass reinforcements and graphite.

Oil seals are generally used between relatively rotatable parts to seal oil or grease in a predetermined location for lubrication. Oil seals include a lip which either rotates relative to a stationary member or is held stationary against a rotating member.

Frequently it is advantageous o provide more than one lip on an oil seal. An auxiliary lip, or excluder lip, may be provided on an oil seal to exclude water or contaminants from the main lip of the seal. Generally oil seals are provided with only one lined lip due to the difficulty and expense of providing more than one lip with a liner. Previously, to provide two lip liners on an oil seal it was necessary to use special molding dies for clamping two teflon elements in separate locations. According to one approach, the primary lip liner is clamped between the upper and lower dies of the mold and an excluder lip liner is clamped between a detachable core element and the lower die.

It is desirable to provide a PTFE liner on an auxiliary seal lip because auxiliary lips are not lubricated and are subject to rapid wear.

Additional manufacturing steps required to clamp two lip lining blanks in the mold increase the cost of such seals making the cost prohibitive for most seal applications. Moreover, conventional molds required to produce seals having two separately lined lips are expensive and costly to operate.

Providing two blanks increases the amount of lip lining material wasted since the clamped segments of both the primary lip liner and the excluder lip liner are normally trimmed off.

SUMMARY OF THE INVENTION

According to the present invention a single seal lip lining blank is adapted to form two separate lip liners on an oil seal. The lip lining blank is an annular wafer having an annular groove on one side. The wafer is severed at the groove to split the groove into at least two rings during a molding operation.

The groove may be a continuous groove or a discontinuous groove comprising a series of serrations arrayed in a circumferential arrangement.

According to another aspect of the present invention the oil seal lip lining blank for forming an oil seal having a plurality of lined lips is formed from a single ring of lip lining material. The ring includes means for splitting the ring into two rings during a molding operation.

The present invention also relates to a method of forming an oil seal which has a plurality of lined sealing lips. The method includes cutting a circumferentially extending groove in an annular wafer of seal lip lining material. The wafer is then loaded into a seal forming mold with a prep ring of elastomeric material and an annular seal case. The mold heats and compresses the wafer and the ring so that the elastomeric material is forced to flow into and against the groove with a force which is sufficient to split the wafer into two pieces at the groove. Upon splitting, one part of the wafer is moved within the seal forming mold to a position corresponding to the desired location of one of the seal lips of the seal. The formed wafer and ring are then removed from the mold and trimmed to form a second seal lip of the oil seal.

The groove in the wafer preferably includes a wall extending perpendicular to the flat wafer surface. The perpendicular wall faces in the opposite direction to the direction that the elastomeric material flows over the wafer. The groove also preferably includes a ramp surface extending at an obtuse angle relative to the surface of the wafer and the opposite end of the perpendicular extending wall from the surface of the wafer in which the groove is cut. The method may include the use of a wafer having a discontinuous groove which includes a series of circumferentially arrayed serrations.

According to the method, a portion of the wafer is formed into a frustoconical shape by the force of the elastomeric material flowing over the surface of the wafer.

The present invention also relates to the oil seal formed by a molding process in which a circumferentially extending groove is cut in an annular wafer of seal lip lining material. The wafer is loaded with a prep ring of elastomeric material into a seal forming mold. The seal is then formed by heating and compressing the wafer and ring in a molding operation wherein the ring flows over the surface of the wafer in which the circumferentially extending groove was cut. The flowing elastomeric material exerts a force against the groove sufficient to split the wafer into two pieces at the groove. A first piece of the wafer is displaced within the seal forming mold to a position corresponding to the desired location of a first seal lip of the oil seal. The molded wafer and ring are then removed from the mold and a second piece of the wafer is trimmed to form a second sealed lip of the seal.

BRIEF DESCRIPTION OF THE DRAWINGS

FIG. 1 is a block diagram showing the basic steps used in performing the method of making an oil seal having a plurality of lined sealing lips according to the present invention;

FIG. 2 is a fragmentary plan view of the blank of seal lip lining material according to the present invention;

FIG. 3 is a cross-sectional view taken along line 3—3 of FIG. 2;

FIG. 4 is a diagrammatic cross-sectional view illustrating the step of cutting a circumferentially extending groove in a billet of lip lining material and severing annular wafers therefrom;

FIG. 5 is a partial cross-sectional view of a seal forming mold at the beginning of a molding operation;

FIG. 6 is a partial cross-sectional view of a mold during the molding operation just prior to splitting the wafer into two parts;

FIG. 7 is a magnified fragmentary cross-sectional view taken from a portion of FIG. 6 indicated by the circle 7;

FIG. 8 is a partial cross-sectional view of a mold at the end of the molding operation;

FIG. 9 is a magnified fragmentary cross-sectional view taken from a portion of FIG. 8 indicated by the circle 9; and FIG. 10 is a partial cross-sectional view of one type of seal made in accordance with the present invention.

DETAILED DESCRIPTION

Referring now to FIG. 1, the method of the present invention is illustrated with each step presented in block diagram form. The diagram cross-references each of the other drawing figures as indicated.

In FIG. 10, a partial cross-section of one exemplary oil seal 10 made in accordance with the present invention is illustrated.

Referring now to FIG. 2, a key component of the present invention is a unique lip liner blank 12, or annular wafer, having a groove 14 which facilitates the splitting of the lip liner blank 12 into two annular pieces. The groove 14 may be an annular groove as shown in FIGS. 2 and 3. Alternatively, the groove may be a discontinuous groove or series of slots extending completely through the wafer. The function of the groove, perforations or slots is to facilitate splitting the annular wafer 12. The groove 14 is formed in the top side 15 of the wafer 12 as viewed in FIG. 3. The groove does not extend through the wafer to the bottom side 16 but is deep enough to weaken the wafer and cause the wafer to fracture upon exertion of a force on the groove as the seal is molded.

The lip liner blank 12 includes an inner annular opening 18 and an outer circumference 20. The groove 14 is preferably concentric relative to the inner annular opening 18 and the outer circumference 20.

The groove 14 in cross-section preferably includes a perpendicular wall 22 which extends from the top side 15 of the wafer 12 perpendicular to the top side 15. A ramp surface 24 extends at an oblique angle relative to the top side 15 of the wafer 12 to the edge 17 of the perpendicular wall 22 which is recessed from the top side 15.

The lip liner blank 12 is formed from a billet 26 as shown in FIG. 4 of filled or unfilled polytetrafluoroethylene (PTFE) material. The PTFE may be filled with glass, graphite or other constituents as is well known in the art.

The wafer is preferably formed by a two step numerically controlled cutoff operation wherein a first step includes forming the groove 14 in the face of the billet 26 with a face groove knife 28. Then, the wafers are severed from the billet 26 by a wafer severing knife 30. The cutoff operation is shown diagrammatically in FIG. 4. It should be readily appreciated that there are many acceptable techniques for forming wafers usable according to the present invention which are known to one having ordinary skill in the art. These techniques also include stamping and molding.

After forming, the wafers are etched with a etching solution such as sodium ammonia or sodium napthylene to create bonding sites to which the elastomeric material may adhere after molding.

Referring now to FIG. 5, a seal forming mold 32 defines a mold cavity 34. The mold cavity 34 is defined by a lower die 36 which includes an annular insert 38. Lower die 36 and insert 38 define the lower portion of the mold cavity 34. The upper portion of the mold cavity 34 is defined by an upper die 40 which is reciprocated relative to the lower die 36 during the molding operation. The insert 38 includes a shoulder portion 42.

An elastomeric prep ring 43 and the lip liner blank 12 are placed on the shoulder 42 with the elastomeric ring 43 disposed on the side of the lip liner blank 12 having the groove 14. As shown in FIG. 5 this is the top side 15 of the lip liner blank 12. An annular case 44 is also preferably loaded into the seal forming mold 32. The case 44 provides a supporting member for the seal. After loading the seal forming mold 32, the upper die 40 is moved toward the lower die 36. The upper die 40 clamps the elastomeric ring 43 and lip liner blank 12 against the shoulder 42 and begins bending the lip liner blank 12 downwardly as viewed in FIG. 5. The mold cavity 34 is heated to melt the elastomeric ring 43 to convert it into a seal body portion 45, as shown in FIG. 6, having the desired configuration. The elastomeric ring 43 is driven by the compression force of the upper die against the lip liner blank 12 which is forced against a frustoconical surface 46 of the insert 38. The elastomeric material is also formed around a lip 48 of the upper die 40 for forming a garter spring groove in the seal 10.

Referring now to FIGS. 6 through 9, the unique splitting step is shown wherein the elastomeric ring 43 flows along the top side 15 of the lip liner blank 12 until it reaches the groove 14. Upon reaching the ramp surface 24 of the groove 14 elastomeric material flows down into the groove until it engages the perpendicular wall 22. The force the elastomer exerts against the perpendicular wall 22 is sufficient to cause the fracture of the lip liner blank 12 at the groove 14 into two annular pieces 49 and 50. Upon fracture, or severance, the elastomeric material continues to exert a force upon the perpendicular wall 22. The first piece 49 is formed from the portion of the wafer between the annular groove and the outer circumference 20. The second piece 50 is formed from the portion of the wafer between the annular groove 14 and the inner annular opening 18.

The first-piece 49 is forced downwardly and outwardly on the frustoconical surface 46 of the insert 38 to a position spaced from the second piece 50. The first piece is forced into engagement with a stop lip 51 formed on the frustoconical surface 46. The stop lip positively locates the second piece 50 to form an auxiliary, excluder, or sealing lip 64.

In the seal illustrated in FIG. 9, a second elastomeric excluder lip 68 is formed by the elastomeric material flowing into a recess 52 defined between the lower die 36 and the insert 38. As the elastomeric material flows within the mold cavity 34 upper and lower flanges 54 and 56 are formed on opposite sides of the case 44 to bond the elastomeric material to the case. After molding, a trimmed edge 60 is formed by cutting the wafer and the elastomeric ring to form a primary seal lip 62. The trimmed edge 60 is formed by a trimming operation as is well known in the art.

Referring again to FIG. 10, a garter spring 58 is shown assembled in a groove formed in the oil seal 10 by the lip 48 of the upper die shown in FIG. 8. The garter spring provides additional radial biasing force for the primary seal lip 62.

The auxiliary, or excluder lip 64 is shown in FIG. 10 with the first ring piece 49 making sealing contact with a relatively rotatable member 66. In addition, a second auxiliary lip 68 formed of elastomeric material also engages the same surface as the auxiliary lip 64 to form an elastomeric second auxiliary lip (68).

The seal made in accordance with the present invention offers the advantage of providing an oil seal having two lined lips. The lined lips are preferably formed of low friction material which reduces the drag and enhances seal wear properties. The seal is provided with two lined lips with little or no increase in manufacturing costs since it is not necessary to load two lip liner blanks into the seal forming mold 32. Also, the lining of two lips is provided with a minimum of lip lining material as it is not necessary to span the entire distance between the two seal lips with liner material. In addition, lip lining material waste is minimized since only one liner blank need be formed.

The method of the present invention is illustrated by the diagram of FIG. 1 based upon the cross-referenced figures and the above description of the elements of the oil seal 10 and the seal forming mold 32.

The method of the present invention begins with the formation of a groove 14 or perforation in an annular wafer 12 of seal lip lining material. The annular wafer is preferably severed from a billet 26 of lining material after the groove 14 is cut. It should be understood that the groove could be cut on an annular wafer otherwise formed.

The wafer and prep ring 43 of elastomeric material are then loaded into the seal forming mold 32 as shown in FIG. 5. The prep ring is preferably placed on the side of the wafer having the groove 14.

The wafer and ring are molded by the application of heat and compression by the upper die 40 with the upper die initially clamping the wafer and prep ring together in the mold cavity. The molding operation continues until the elastomeric material flows into the groove and exerts a force against the perpendicular wall 22 of the groove 14. This force causes the lip liner blank 12 to split into first and second pieces 49 and 50. After splitting, the first piece 49 is shifted away from the second piece within the seal forming mold. The first piece comes to rest against a stop lip 51 which positively locates the first piece to function as a auxiliary lip 64. During the molding operation the seal is bonded to a case 49 and an annular groove is formed for receiving a garter spring 58.

The molded body is then removed from the seal forming mold and trimmed to form a trimmed edge 60 which is the primary seal lip 62 of the oil seal 10.

While the best mode for carrying out the invention has been described in detail, those familiar with the art with which this invention relates will recognize various alternative designs and embodiments for carrying out the invention as defined by the following claims.

I claim:

1. A method of forming an oil seal having a plurality of lined sealing lips comprising:
   cutting a circumferentially extending groove in an annular wafer of seal lip lining material;
   positioning said annular wafer in a seal forming mold; and, molding a body portion of the seal by heating and compressing said wafer and a prep ring of elastomeric material in said seal forming mold, the elastomeric material of said prep ring flowing over a surface of said wafer in which said circumferentially extending groove opens, the flowing elastomeric material of the prep ring exerting a force against the groove sufficient to split said wafer into two pieces at the groove and
   to displace a first piece of said wafer within the seal forming mold to a position corresponding to a desired location of a first seal lip of the oil seal, at least a portion of the second piece of said wafer remaining at a desired position of another seal lip of the oil seal.

2. The method of claim 1 further comprising the step of trimming the body portion across the second piece of said wafer to form a second seal lip of the oil seal.

3. The method of claim 1 wherein said molding step is preceded by a step of etching the surface of the wafer to create bonding sites for securing the elastomeric material to the wafer.

4. The method of claim 1 wherein said molding step includes forming a portion of the wafer into a frustoconical shape by the force of the elastomeric material of the prep ring flowing over the surface of the wafer.

5. The method of claim 1 wherein said groove is formed with a first wall extending perpendicularly to said surface, said first wall facing in the direction opposite the direction that the elastomeric material of the prep ring flows over the wafer.

6. The method of claim 5 wherein said groove is formed with a second wall extending at an oblique angle relative to said surface between said surface and the end of the first wall opposite the surface.

7. The method of claim 1 wherein said groove is a discontinuous groove in the form of a series of perforations arrayed in a circumferential arrangement.

* * * * *